(12) United States Patent
Berroth

(10) Patent No.: US 10,550,847 B2
(45) Date of Patent: Feb. 4, 2020

(54) MIXED-FLOW OR DIAGONAL VENTILATING FAN WITH CONSISTENT COOLING

(75) Inventor: Hansjoerg Berroth, Villingen-Schwenningen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 13/641,115

(22) PCT Filed: Mar. 20, 2012

(86) PCT No.: PCT/EP2012/001216
§ 371 (c)(1),
(2), (4) Date: Oct. 13, 2012

(87) PCT Pub. No.: WO2012/130404
PCT Pub. Date: Oct. 4, 2012

(65) Prior Publication Data
US 2013/0028759 A1 Jan. 31, 2013

(30) Foreign Application Priority Data
Mar. 26, 2011 (DE) .......... 10 2011 016 146

(51) Int. Cl.
*F04D 25/08* (2006.01)
*F04D 29/08* (2006.01)
(Continued)

(52) U.S. Cl.
CPC ....... *F04D 25/082* (2013.01); *F04D 25/0613* (2013.01); *F04D 29/083* (2013.01); *F04D 29/281* (2013.01); *H02K 7/14* (2013.01)

(58) Field of Classification Search
CPC .... F04D 25/08; F04D 25/082; F04D 25/0613; F04D 29/5806; F04D 29/582; F04D 29/083; F04D 29/164
(Continued)

(56) References Cited

U.S. PATENT DOCUMENTS

| 4,150,919 A | 4/1979 | Matucheski ................. 416/93 R |
| 4,583,911 A * | 4/1986 | Braun ................... F04D 29/681 415/116 |

(Continued)

FOREIGN PATENT DOCUMENTS

| DE | 74 22 753 U | 1/1975 |
| DE | 41 27 134 A1 | 2/1993 |

(Continued)

OTHER PUBLICATIONS

English Translation of Bosch (EP 569738 A1).*
(Continued)

*Primary Examiner* — Devon C Kramer
*Assistant Examiner* — Christopher J Brunjes
(74) *Attorney, Agent, or Firm* — Dickinson Wright PLLC

(57) ABSTRACT

A self-cooling diagonal ventilating fan (30; 130) has a fan housing (36) and a fan wheel (80), rotatable around a rotation axis (168), that has, associated with it, an electronically commutated motor (73) which has an internal stator (64) and an external rotor (68, 152). Cooling air, after it emerges from the electric motor (73), is drawn through at least one opening (90) formed in the fan wheel (80) to the outer side of the fan wheel (80), in order, during operation, to maintain a constant cooling air stream (158) in a consistent flow direction through the internal stator (64) of the electric motor (73), regardless of possible backpressure.

14 Claims, 6 Drawing Sheets

(51) Int. Cl.
*H02K 7/14* (2006.01)
*F04D 29/28* (2006.01)
*F04D 25/06* (2006.01)

(58) Field of Classification Search
USPC ............... 417/423.7, 423.14, 352–354, 366; 416/93 R, 94, 90 R; 415/115; 310/61, 60
See application file for complete search history.

(56) References Cited

U.S. PATENT DOCUMENTS

| | | | | |
|---|---|---|---|---|
| 5,326,225 A * | 7/1994 | Gallivan | ............... | F04D 29/164 416/169 A |
| 5,343,106 A | 8/1994 | Lungu | ............. | 310/239 |
| 5,610,458 A * | 3/1997 | Baker | .................... | F04D 25/08 310/68 R |
| 5,695,318 A * | 12/1997 | Harmsen | ................. | F04D 17/06 415/218.1 |
| 5,944,497 A | 8/1999 | Kershaw et al. | .......... | 417/423.8 |
| 6,384,494 B1 | 5/2002 | Avidano | .......................... | 310/58 |
| 7,701,097 B2 | 4/2010 | Lan et al. | ........................ | 310/61 |
| 2007/0205676 A1 * | 9/2007 | Lan | ..................... | F04D 25/0613 310/58 |

FOREIGN PATENT DOCUMENTS

| | | | | |
|---|---|---|---|---|
| DE | 0569738 A1 * | 11/1993 | ........... | F04D 25/082 |
| DE | 295 08 358 U | 8/1995 | | |
| EP | 569 738 A | 11/1993 | | |
| EP | 569738 A1 * | 11/1993 | | |
| EP | 561 864 B1 | 3/1995 | | |
| EP | 921 318 A | 6/1999 | | |
| EP | 1 050 682 A | 11/2000 | | |
| FR | 941 416 A | 1/1949 | | |
| FR | 2 236 384 | 1/1972 | | |
| JP | 07-023 964 A | 2/2007 | | |

OTHER PUBLICATIONS

Labyrinth Seal—Wikipedia page.*
EP 0569738 A1—English Translation.*
Labyrinth Seal—Wikipedia.*

* cited by examiner

MIXED-FLOW OR DIAGONAL VENTILATING FAN WITH CONSISTENT COOLING

CROSS-REFERENCE

This application is a section 371 of PCT/EP12/01216, filed 30 Mar. 2012, and further claims priority from DE 10 2011 016 146.5.

FIELD OF THE INVENTION

The invention relates to a diagonal ventilating fan having a fan housing and having a fan wheel rotatable around a rotation axis, said wheel having an electric motor associated with it, in order to drive it.

BACKGROUND

A diagonal ventilating fan of this kind is known from the Assignee's DE 4 127 134 A1 and corresponding U.S. Pat. No. 5,695,318, HARMSEN. The fan wheel therein is in the shape of a truncated cone on whose conical surface the fan blades are arranged. It has in its interior a hollow-cylindrical portion, and pressed thereinto is the cup-shaped magnetic yoke of the external rotor of an electronically commutated (EC) motor. The internal stator of this EC motor is mounted on the outer side of a bearing tube, in which ball bearings for journaling the external rotor are located.

The disadvantage that results with this type of configuration of a diagonal ventilating fan is that the EC motor is poorly cooled, so that it can deliver only a low performance level, since it would be thermally overloaded at higher performance levels. It could be said that a diagonal ventilating fan is "cooling-impaired," which correspondingly reduces its performance.

US 2007/0 205 676 A1, LAN et al., presents an axial ventilating fan in which the external rotor of the drive motor is mounted with a radial spacing in a fan wheel. The result is to produce around the external rotor an annular cavity through which cooling air flows during operation. The pumping effect for generating this cooling air stream is generated by centrifugal action when the ventilating fan is in operation.

In a ventilating fan of this kind, the flow direction of the cooling air can reverse when the dynamic pressure at the outlet rises, i.e. the cooling air then flows from the outlet to the inlet of the ventilating fan, since the pressure that is generated by centrifugal force is weak in relation to the pressure generated by the fan wheel. The reason is that when the ventilating fan is operating in a free-outlet manner, the cooling air is entrained, as it exits from the ventilating fan, by the main air stream generated by the latter.

If the ventilating fan is instead operating not in a free-outlet manner but instead against a dynamic pressure, the direction of the cooling air stream is then reversed.

During the time span during which the direction of the cooling air stream changes, the air in the ventilating fan is stagnant and its electric motor is consequently not cooled; this can result in rapid destruction thereof.

SUMMARY OF THE INVENTION

It is therefore an object of the invention to make available a novel diagonal ventilating fan, not vulnerable to flow reversal.

According to the invention this object is achieved by configuring the fan wheel, and fan blades projecting therefrom, in such a way that, during operation, a negative-pressure air zone arises on a backside of each fan blade, and by forming a hole adjacent each such zone, extending from an interior of the fan wheel to a radial outer surface thereof, so that air is continuously drawn out of the central interior of the fan wheel, thereby providing a constant flow of cooling air over the stator portion of the fan motor. A seal between the central interior of the fan wheel and the air outlet side of the fan tends to oppose pressure equalization between those regions. In this context, the negative pressure in a negative-pressure zone on the back side of at least one fan blade is used to produce a delivery pressure difference that, during operation, keeps the cooling air stream constantly moving in the same direction.

It is particularly advantageous here that, although the pressure in the negative-pressure zones behind the fan blades is not uninfluenced by the counterpressure that acts on the fan, the direction of the pressure gradient at the negative-pressure zones in the working range of the fan nevertheless does not change, while the magnitude of the pressure difference there depends on the counterpressure.

The location of the negative-pressure zone does shift as a function of the dynamic pressure, but its core continues to exist, regardless of the dynamic pressure, so that with this (powerful) negative pressure, it is possible to generate, through the electric motor, a cooling air stream whose direction does not change over the entire working range of the diagonal ventilating fan, and which thus produces effective cooling over the entire working range.

BRIEF FIGURE DESCRIPTION

Further details and advantageous refinements of the invention are evident from the exemplifying embodiments that are described below and depicted in the drawings.

Figure 2:
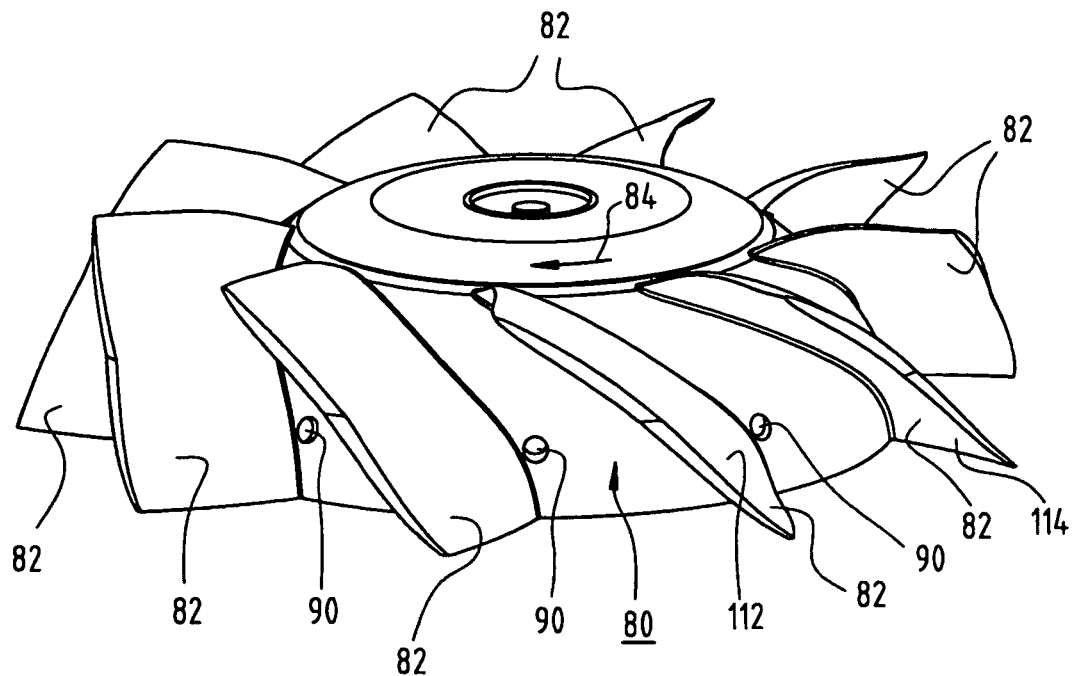
FIG. 2 is a three-dimensional depiction of a fan wheel.
Figure 3:
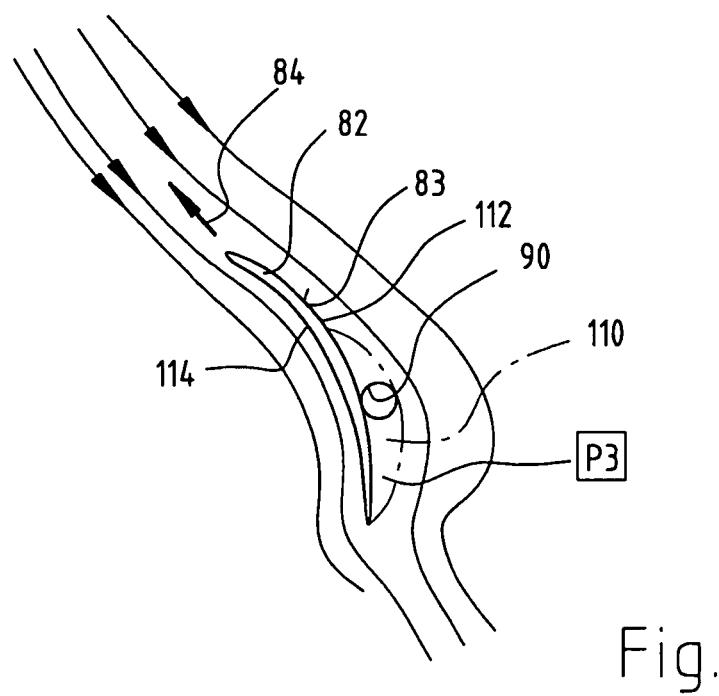
Figure 4:
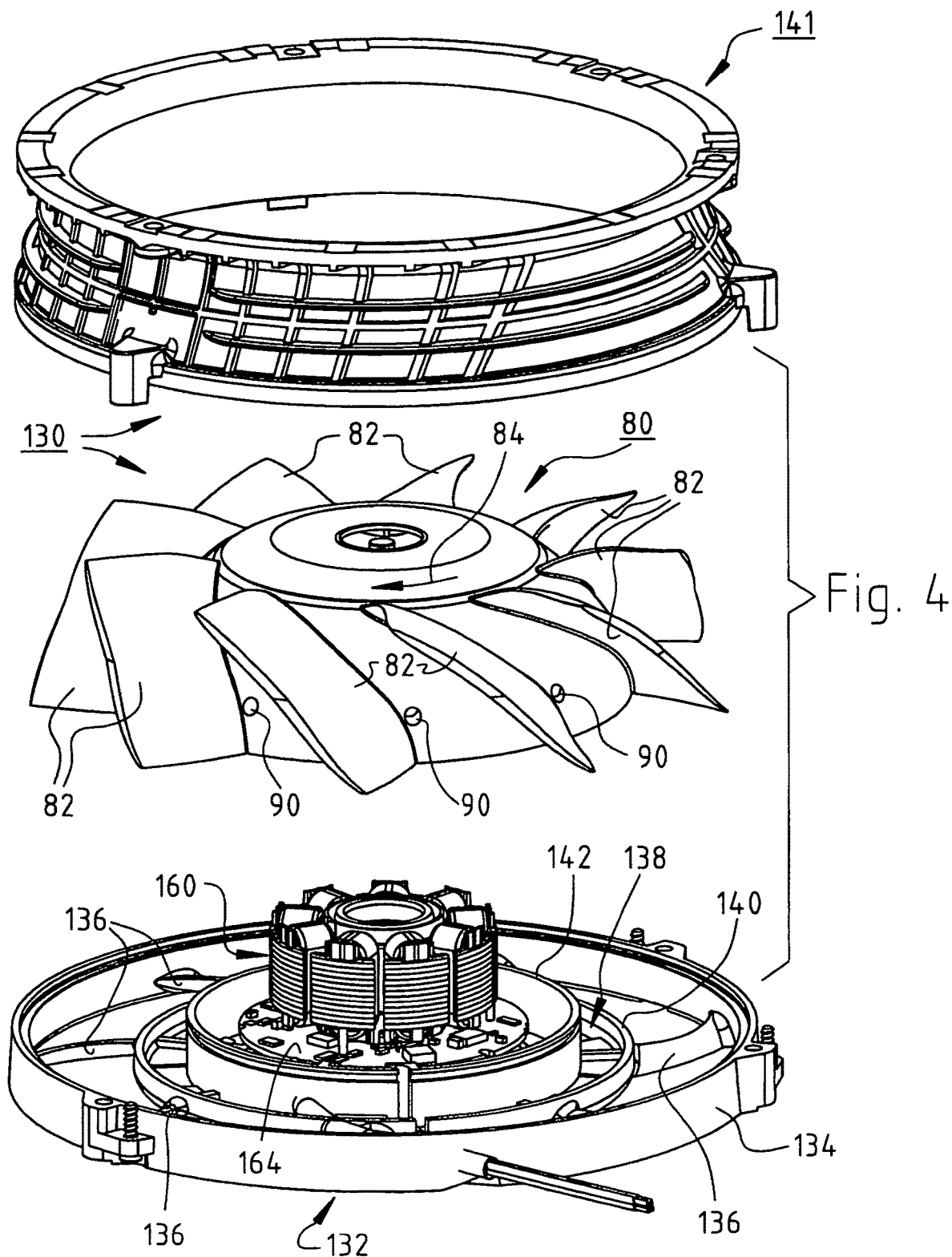
Figure 5:
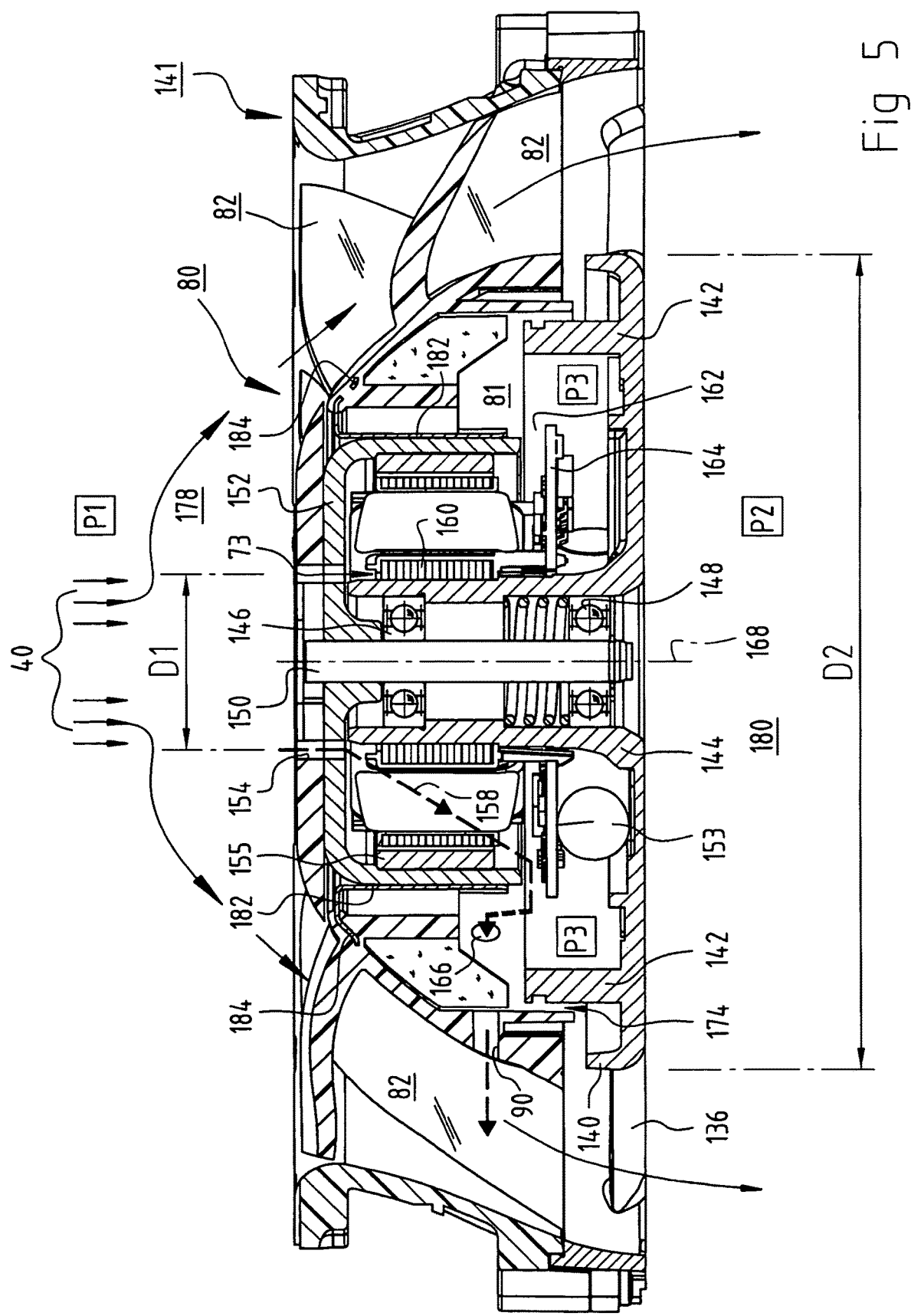
Figure 6:
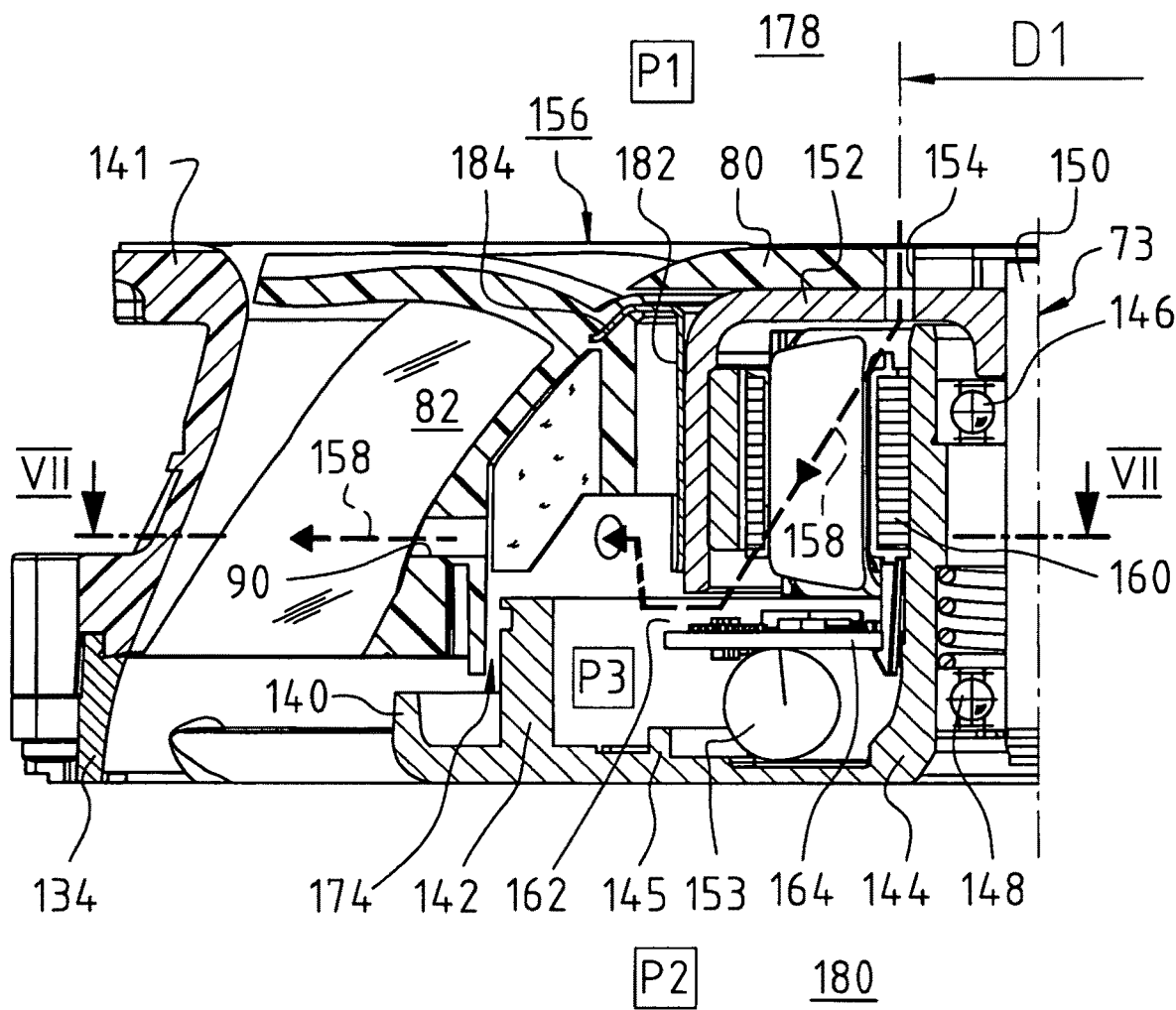
Figure 7:
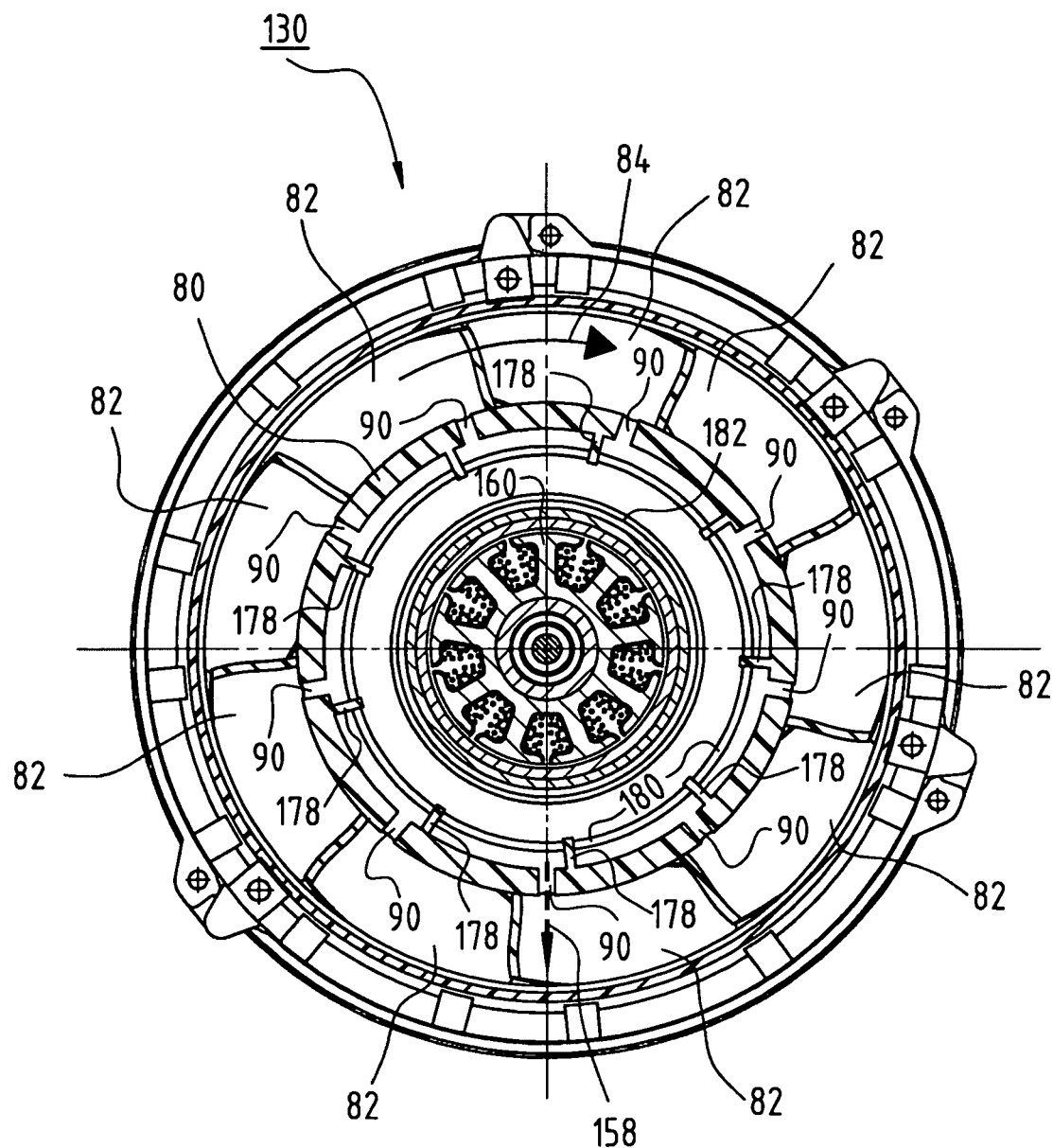

FIG. 3 is a schematic depiction of the generation of negative pressure at a fan blade, FIG. 4 is an exploded perspective depiction of a diagonal ventilating fan whose fan wheel is implemented similarly to FIG. 2, FIG. 5 depicts the path of cooling air through the diagonal ventilating fan of FIG. 4, only one of the flow paths being depicted, FIG. 6 is an enlarged depiction of the left half of FIG. 5, and FIG. 7 is a section viewed along line VII-VII of FIG. 6.

DETAILED DESCRIPTION

Figure 1:
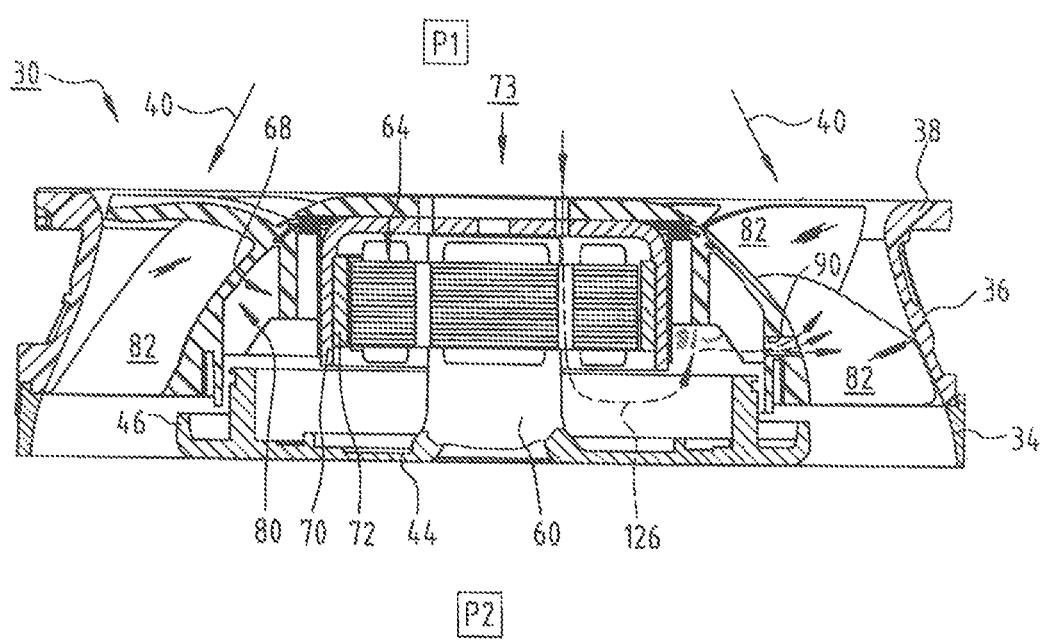
FIG. 1 is a schematic longitudinal section of a diagonal ventilating fan.

FIG. 1 shows, at the bottom, base 32 of a diagonal ventilating fan 30. The latter has externally a ring 34 that is implemented for connection to a fan housing 36 that tapers from the bottom upward in FIG. 1 and widens again at upper rim 38. Ring 34 and fan housing 36 are connected in suitable fashion, e.g. by bolting or by a bayonet connection (see FIGS. 4 to 6). The main flow direction of the air is indicated by arrows 40.

Connected to ring 34 is a flange 44 that has, at its periphery, an elevated rim 46. Flange 44 transitions at its center into a bearing tube 60 on which is arranged the lamination stack (not depicted) of an internal stator 64 (cf. lamination stack 160 of FIG. 4 and FIG. 5). Internal stator 64 is surrounded by an external rotor 68. The latter has a cup-like magnetic yoke 70, in which a permanently magnetic ring magnet 72 is mounted. External rotor 68 and internal stator 64 are parts of an electric motor 73.

Internal stator 64 interacts with corresponding poles of ring magnet 72.

Magnetic yoke 70 is surrounded by an impeller or fan wheel 80. Its rotation direction is indicated in FIG. 2 and FIG. 4 at 84, i.e. clockwise when viewed from above.

As FIG. 1 shows, fan wheel 80 is arranged at a radial distance from motor 73, so that the latter is largely thermally insulated and poorly cooled if particular measures are not taken.

An improvement is obtained by the fact that respective openings 90 are provided in fan wheel 80 in the region of back side 112 of fan blades 82 and at their blade roots. These openings are each located in the region of a negative-pressure zone 110 (FIG. 3) that forms behind a fan blade 82 as it rotates, so that air is drawn outward through openings 90 and through fan wheel 80, thus improving the cooling of motor 73. It is advantageous here that the direction of the air flow through holes 90 does not change during operation, even though the intensity of that air flow may vary as a function of various operating conditions. The air flow always flows outward through fan wheel 80; a further result of this flow of relatively strongly heated air is also that any moisture that has accumulated in motor 73 is quickly conveyed outward through holes 90. This prevents moisture from collecting in the interior of motor 73.

The generation of a cooling air stream 126 in accordance with FIG. 1 is based on the effect that a negative-pressure zone 110 occurs on a back side 112 (FIG. 3) of each fan blade 82 during operation (see FIG. 3). This zone is generated by the fact that the relevant fan blade 82 is moving through an air zone in which there is little fluctuation in pressure, so that the negative pressure P3 (FIG. 3) in negative-pressure zone 110 also exhibits little fluctuation and, most of all, is consistently lower than the pressure P1, even though the magnitude of the pressure difference can change somewhat depending on operating conditions. The shape of negative-pressure zone 110 also changes during operation as a function of rotation speed, dynamic pressure P2, etc., but within relatively narrow limits, so that one can create an orifice 90, for example, in the core zone of negative-pressure zone 110, in order to utilize this negative pressure P3 for continuous cooling and drying of electric motor 73.

Cooling air 126 (FIG. 1) flows through stator 64 of ECM 73 and cools it.

What is particularly advantageous and surprising here is the fact that no reversal of the flow direction of cooling air 126 takes place during operation, since, during operation, air is constantly being drawn outward through openings 90.

FIG. 4 shows a variant of the ventilating fans of FIGS. 1 to 3. Identical or identically functioning parts are labeled with the same reference characters as in FIGS. 1 to 3.

Ventilating fan 130 according to FIG. 4 has a base part 132. This has externally a ring 134 on which a shell-like part 138 is attached by struts 136, which ring also serves for mounting a fan housing 141. The latter has an outer rim 140 that is relatively low. Adjoining it, toward the inside, is an annular shoulder 142 that serves principally as an accidental contact protector and as protection against the penetration of moisture and dirt, and inside which is arranged a bearing tube 144 that is depicted in FIG. 5.

Arranged in bearing tube 144 are two ball bearings 146, 148 that serve to journal a rotor shaft 150 on which is mounted a rotor cup 152, on the inner side of which is mounted a rotor magnet 155. Located below rotor cup 152 is a circuit board 164 on which electronic components 153 of EC motor 73 are arranged.

In addition, a fan wheel 156 is mounted on the upper end of rotor shaft 150, which wheel has (in this example) approximately the shape of a dome, on whose outer side fan blades 82 are arranged.

Air inlet openings 154 are provided close to rotor shaft 150 on an air entrance reference circle having a diameter D1; said openings penetrate through fan wheel 80 and rotor cup 152, and through them a cooling air stream 158 can flow into the wound stator lamination stack 160, in order to cool it.

Air stream 158 can flow through the gap between stator lamination stack 160 and circuit board 164, and outward through an opening 166 and through holes 90 in the cup of fan wheel 80. As shown e.g. by FIG. 3, holes 90 are located in negative-pressure zones 110 on back side 112 of blades 82, thereby ensuring, during operation, a constant flow of cooling air in the same direction, namely toward negative-pressure zones 110.

Another important aspect is that openings 90 are at a substantially greater distance from rotation axis 168 of the fan wheel than inlet openings 154. For example, this distance can be, for openings 90, approximately two to six times as great as the distance of inlet openings 154 from rotation axis 168 (see, in FIG. 5, the difference between diameters D1 and D2 of the reference circles at air entrance 154 and at air exit 180).

Mode of Operation

During operation, cooling air is forced to flow through electric motor 73 on a predefined path, in order to cool internal stator 160.

For this, cooling air enters motor 73 from the top in FIG. 5 through holes 154 in magnetic yoke 152. Magnetic yoke 152 is, for this purpose, sealed at its periphery and mounted in fan wheel 80, so that cooling air stream 126 in FIG. 1 is forced through motor 73.

A so-called "round" 182, i.e. a kind of tube made of sheet metal, is mounted for this purpose in fan wheel 80. This tube has, at its upper (in FIG. 5) rim, a flange 184 that is equipped with openings, and this flange 184 is, as depicted, attached to fan wheel 80 e.g. by injection molding.

The magnetic yoke of the rotor is pressed into this tube 182 from below, in which context a counter-force can be exerted on flange 184 from above. Tube 182 is preferably manufactured from ferromagnetic material, and thereby forms part of magnetic yoke 152.

After emerging from motor 73, the (heated) air flows outward through openings 90 in fan wheel 80 (see FIG. 2, FIG. 3, and FIG. 5). Air must be prevented, in this context, from being drawn, from the outlet side (under pressure P2), by negative pressure P3 into the interior of the fan wheel (FIG. 5).

This is achieved, in accordance with FIG. 5 and FIG. 6, by means of a labyrinth seal 174 that largely prevents air from flowing there from the bottom upward. It is advantageous here if the pressure P3 on inner side 81 of fan wheel 80 does not have too negative an influence on the seal produced by labyrinth seal 174.

After flowing through motor 73, cooling air stream 158 passes, in FIG. 5, outward through the gap between the lower end of magnetic yoke 152 and circuit board 164, flows through air passage 166, and flows through one of openings 90 to an associated negative-pressure zone 110 (FIG. 3) on the outer side of fan wheel 80.

FIG. 7 is a section along line VII-VII of FIG. 6. This section extends through the radial holes 90 (see preceding Figures). These holes 90 penetrate through fan wheel 80 in the region of the roots of blades 90 (see FIG. 2). Fan blades 82 are provided externally on fan wheel 80; their preferred shape is evident, from FIG. 2 or 4.

Provided internally on fan wheel 80 are stiffening walls 178, extending radially between holes 90, which can be further reinforced by a wall 180 extending in a circumferential direction.

The result of this is that the cooling of electric motor 73 in a diagonal ventilating fan is substantially improved with very simple measures, with the result that the performance of ventilating fan 130 is improved. This is moreover positively influenced by the high efficiency of the electronically commutated electric motor 73.

FIGS. 1 to 7 show a diagonal ventilating fan that comprises:

a fan housing 36; a fan wheel 80, rotatable around a rotation axis 168, that has associated with it an electric motor 73 to drive it, fan wheel 80 extending in the direction of rotation axis 168 between an air inlet side 178 and an air outlet side 180 of diagonal ventilating fan 30, 130 and serving, as it rotates, to convey air in a main delivery direction 40 from air inlet side 178 to air outlet side 180; fan blades 82 provided on fan wheel 80 which have, with reference to rotation direction 84 of fan wheel 80 during operation, a front side 114 and a back side 112, such that there occurs on fan wheel 80 during operation, in the region of back side 112 of each blade 82, a negative-pressure zone 110 that is connected via an opening 90 of fan wheel 80 to the latter's inner side 81, in order to draw cooling air outward from inner side 81 of fan wheel 80, so that the pressure on the inner side 81 is a function of the negative pressure on the back side of at least one blade 82; a sealing arrangement 174 provided between said inner side 81 and air outlet side 180 of the diagonal ventilating fan, which arrangement, during operation, opposes a pressure equalization between pressure P2 on air outlet side 180 and pressure P3 in inner side 81 of fan wheel 80; at least one inlet opening 154, provided in the region of air inlet side 178 of fan wheel 80, through which cooling air can flow into electric motor 73, which cooling air, after it emerges from electric motor 73, is drawn through the at least one opening 90 of fan wheel 80 to the outer side of fan wheel 80, in order, during operation of diagonal ventilating fan 30, to maintain a constant cooling air stream 158 in a consistent direction through electric motor 73.

The sealing arrangement provided between inner side 81 and air outlet side 180 of fan wheel 80 is preferably implemented as a labyrinth seal 174.

A respective opening 90 in fan wheel 80 is preferably provided in the region of an adjacent blade root.

Opening 90 is preferably provided at a location at which the flow path of the air delivered by diagonal ventilating fan 30, 130 during operation experiences a deflection.

At least one air entrance opening 154 of fan wheel 80 is preferably located on an air entrance reference circle having a diameter D1, and at least one air exit opening 90 of fan wheel 80 is located on an air exit reference circle having a diameter D2, where D2 is greater than D1. More preferably, the ratio of D2 to D1 is in a range from 2 to 10. More preferably, the ratio is in the range from 3 to 9.

Cooling air stream 158 is preferably directed, during operation, through stator 66 of electric motor 73 in order to cool it.

Many variants and modifications are of course possible, within the scope of the invention. These relate, for example, to the shape and location of openings 90, and to the internal configuration of electric motor 73, in order to guide the cooling air through motor 73 in a particularly beneficial manner and thereby to achieve particularly good performance on the part of electric motor 73.

The invention claimed is:

1. A diagonal ventilating fan comprising:
    a fan housing (36) circumferentially surrounding a fan wheel (80);
    said fan wheel (80), being rotatable about a rotation axis (168), and having an electric motor (73) to drive said fan wheel, said electric motor including a rotor portion (68, 152) and a stator portion (64, 160), the fan wheel (80) extending in a direction of the rotation axis (168) between a smaller-diameter air inlet side (178) and a larger-diameter air outlet side (180) of the diagonal ventilating fan (30; 130) and serving, as said fan wheel (80) rotates, to convey air in a main delivery direction (40) from the air inlet side (178) to the air outlet side (180);
    fan blades (82), provided on the fan wheel (80), which each have, with reference to a rotation direction (84) of the fan wheel (80) during operation, a front side (114) and a back side (112), such that during operation there occurs, on the fan wheel (80), adjacent said back side (112) of each of the fan blades (82), a negative-pressure air zone (110) that is connected, via at least one air exit opening (90) formed in the fan wheel (80), to an inner side of the fan wheel (81), in order to draw cooling air outward from said inner side (81) of the fan wheel (80), so that air pressure on said inner side (81) is a function of a negative pressure value arising on the back side (112) of at least one of the fan blades;
    a sealing arrangement (174), provided between said inner side (81) and the air outlet side (180) of the diagonal ventilating fan, and separating said fan wheel (80) from a radially adjacent stationary element, which arrangement, during operation, opposes a pressure equalization between a pressure (P2) on the air outlet side (180) and the pressure (P3) on the inner side (81) of the fan wheel (80) to prevent conveyance of air from the air outlet side (180) into the fan wheel (80);
    at least one inlet opening (154) is provided adjacent the air inlet side (178) of the fan wheel (80), through which cooling air can flow into the electric motor (73), which cooling air, after the cooling air emerges from the electric motor (73), is drawn through the at least one air exit opening (90) of the fan wheel (80) to an outer side of the fan wheel (80), in order to maintain, during operation of the diagonal ventilating fan (30), a cooling air stream (158) flows through said stator portion (64, 150) of the electric motor (73) in order to cool said stator portion (64, 150); and
    said fan wheel (80) being disposed between the fan housing (36 and a base part (132), the base part (132) having an annular shoulder (142) that extends in the direction of the rotation axis (168) toward the air inlet side (178), the annular shoulder (142) defining a region in which electronic components of the electric motor (73) can be disposed, the region being more distal from the air inlet side (178) than the at least one air exit opening (90) of the fan wheel (80), the cooling air stream (158) flowing into the region before exiting the fan wheel (80) via the at least one air exit opening (90).

2. The diagonal ventilating fan according to claim 1, wherein said sealing arrangement, provided between the inner side (81) and the air outlet side (180) of the fan wheel (80), is implemented as a labyrinth seal (174).

3. The diagonal ventilating fan according to claim 2, wherein
the cooling air stream (158) is directed, during operation, in a constant manner and in a consistent direction, through the stator portion (64, 160) of the electric motor (73) in order to cool said stator portion (64, 160).

4. The diagonal ventilating fan according to claim 1, wherein
the air exit opening (90) radially through the fan wheel (80) is provided adjacent a root of each of the fan blades (82).

5. The diagonal ventilating fan according to claim 4, wherein
the cooling air stream (158) is directed, during operation, in a constant manner and in a consistent direction, through the stator portion (64, 160) of the electric motor (73) in order to cool said stator portion (64, 160).

6. The diagonal ventilating fan according to claim 1, wherein said air exit opening (90) formed in the fan wheel (80) is provided at a location at which a flow path, of the air delivered by the diagonal ventilating fan (30; 130) during operation, experiences a deflection.

7. The diagonal ventilating fan according to claim 6, wherein
the cooling air stream (158) is directed, during operation, in a constant manner and in a consistent direction, through the stator portion (64, 160) of the electric motor (73) in order to cool said stator portion (64, 160).

8. The diagonal ventilating fan according to claim 1, wherein said at least one air inlet opening (154) of the fan wheel (80) is located on an air entrance reference circle having a diameter D1, and
said at least one air exit opening (90) of the fan wheel (80) is located on an air exit reference circle having a diameter D2, where diameter D2 is greater than diameter D1.

9. The diagonal ventilating fan according to claim 8, wherein a ratio of D2 to D1 falls within a range from 2 to 10.

10. The diagonal ventilating fan according to claim 9, wherein
the cooling air stream (158) is directed, during operation, in a constant manner and in a consistent direction, through the stator portion (64, 160) of the electric motor (73) in order to cool said stator portion (64, 160).

11. The diagonal ventilating fan according to claim 9, wherein
the ratio falls within the range from 3 to 9.

12. The diagonal ventilating fan according to claim 11, wherein
the cooling air stream (158) is directed, during operation, in a constant manner and in a consistent direction, through the stator portion (64, 160) of the electric motor (73) in order to cool said stator portion (64, 160).

13. The diagonal ventilating fan according to claim 1, wherein the sealing arrangement employs a gap between the fan wheel (80) and the base part (132).

14. The diagonal ventilating fan according to claim 1, wherein the sealing arrangement employs a gap between the inner side (81) of the fan wheel (80) and an outer surface of the annular shoulder (142) of the base part (132).

* * * * *